United States Patent [19]
Shyu

[11] Patent Number: 5,166,780
[45] Date of Patent: Nov. 24, 1992

[54] APPARATUS FOR SHOWING A DIGITIZED NTSC-ENCODED VIDEO

[75] Inventor: Rong-Fuh Shyu, Hsinchu, Taiwan

[73] Assignee: Windbond Electronic Corp., Hsinchu, Taiwan

[21] Appl. No.: 810,297

[22] Filed: Dec. 19, 1991

[51] Int. Cl.$^5$ ...................... H04N 11/20; H04N 7/04
[52] U.S. Cl. ...................................... 358/11; 358/141
[58] Field of Search ................... 358/11, 12, 140, 141

[56] References Cited

U.S. PATENT DOCUMENTS

| | | | |
|---|---|---|---|
| 3,716,665 | 2/1973 | Morio et al. | 358/24 |
| 4,875,089 | 10/1989 | Judge | 358/11 |
| 4,956,707 | 9/1990 | Oakley et al. | 358/140 |

FOREIGN PATENT DOCUMENTS 2232035  11/1990  United Kingdom .

Primary Examiner—John K. Peng
Attorney, Agent, or Firm—Mason, Fenwick & Lawrence

[57] ABSTRACT

An apparatus for showing a digitized NTSC-encoded video signal on an NTSC or PAL color television screen includes a system memory unit for storing the digitized video signal therein. A sync generator provides NTSC or PAL horizontal and vertical sync signals depending upon the type of color television screen in use. A sync delay and shading circuit provides an appropriate delay to the PAL horizontal and vertical sync signals when a PAL color television screen is in use. The horizontal and vertical sync signals control the cathode ray tube (CRT) unit to access the digitized video image in the system memory unit. The sync delay and shading circuit also disables the CRT control unit, a color burst generator, a (B-Y) and an (R-Y) color difference digital-to-analog (D/A) converter and a luminance and sync D/A converter during a 100 scan line period in which no video image is being displayed when the PAL color television screen is in use. The resulting effect is that a shaded region corresponding to 50 scan lines can be seen on the top and bottom portions of the PAL color television screen. Furthermore, a 0.5 microseconds blank in the horizontal direction is almost equally distributed on the left and right sides of the PAL color television screen. This minimizes the occurrence of distorted images and can thus provide a better viewing effect.

1 Claim, 2 Drawing Sheets

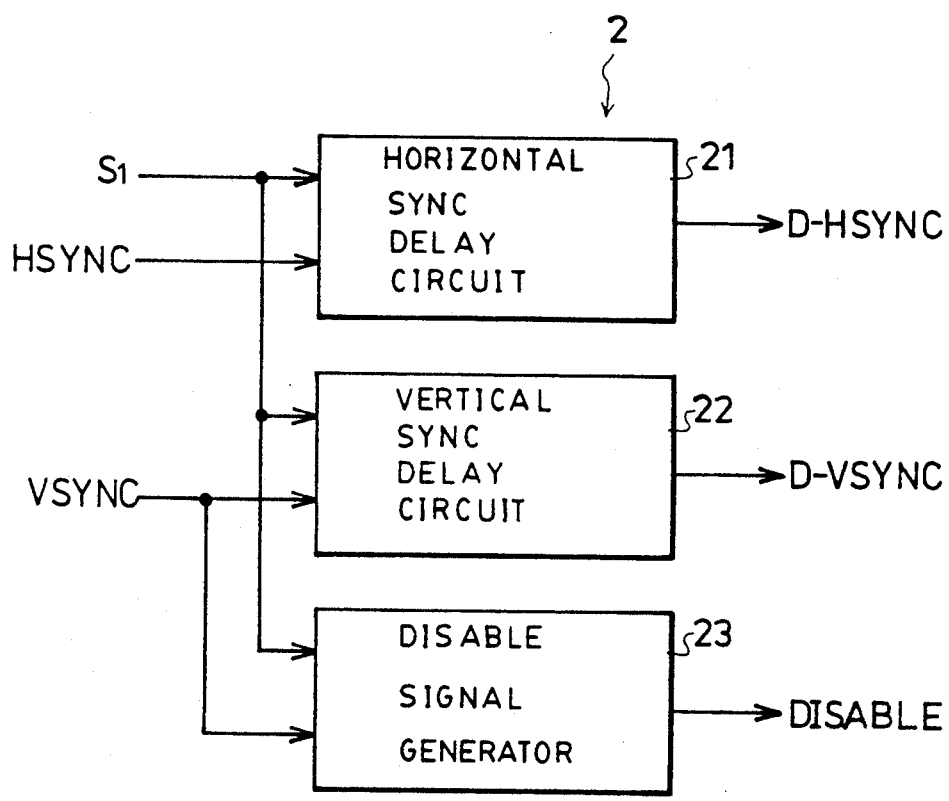
F I G. 2

APPARATUS FOR SHOWING A DIGITIZED NTSC-ENCODED VIDEO

BACKGROUND OF THE INVENTION

1. Field of the Invention

The invention relates to a color television system, more particularly to an apparatus for showing a digitized NTSC-encoded video signal on an NTSC or PAL color television screen.

2. Description of the Related Art

NTSC and PAL are two standard color television systems which are widely used in North America and Europe. The main difference between the two television systems are as follows:

a. The color subcarrier frequency for the NTSC system is 3.58 MHz and is 4.43 MHz for the PAL system.

b. The horizontal sync frequency for the NTSC system is 15734 Hz and is 15625 Hz for the PAL system.

c. The vertical sync frequency for the NTSC system is 59.94 Hz and is 50 Hz for the PAL system.

d. The number of lines per picture (frame) for the NTSC system is 525 and is 625 for the PAL system.

When one frame of an NTSC-encoded video signal is viewed on a PAL television screen, a 0.5 microsecond blank is formed in the horizontal direction. Furthermore, there are 100 horizontal scan lines in which no video image is being displayed. The NTSC-encoded video signal thus appears compressed when viewed on the PAL television screen.

SUMMARY OF THE INVENTION

Therefore, the main objective of the present invention is to provide an apparatus which permits viewing of a digitized NTSC-encoded video signal on an NTSC or PAL color television screen.

Accordingly, the preferred embodiment of an apparatus of the present invention is used for showing a digitized NTSC-encoded video signal on an NTSC or PAL color television screen and comprises: a system memory unit for storing a digitized NTSC-encoded video signal therein; a sync generator means for generating an NTSC horizontal sync signal and an NTSC vertical sync signal when an NTSC color television screen is in use and for generating a PAL horizontal sync signal and a PAL vertical sync signal when a PAL color television screen is in use; a sync delay and shading circuit means for providing an appropriate delay to the PAL horizontal and vertical sync signals, said sync delay and shading circuit means being disabled when an NTSC color television screen is in use, said sync delay and shading circuit means providing a disable signal during a 100 line scan period in which no video image is being displayed when a PAL color television is in use; a cathode ray tube control unit receiving the NTSC horizontal and vertical sync signals when an NTSC color television screen is in use and receiving the delayed PAL horizontal and vertical sync signals when a PAL color television screen is in use, said horizontal and vertical sync signals controlling the cathode ray tube control unit to access the digitized NTSC-encoded video image in the system memory unit, said cathode ray tube control unit having a pixel color signal output and being temporarily disabled upon reception of the disable signal from the sync delay and shading circuit means; a subcarrier generator means for generating an NTSC color subcarrier when an NTSC color television screen is in use and for generating a PAL color subcarrier when a PAL color television screen is in use; a color encoder means to generate a luminance signal (Y), a (B-Y) color difference signal and an (R-Y) color difference signal from the pixel color signal output of the cathode ray tube control unit; a quadrature modulation means receiving the color subcarrier from the subcarrier generator means and the (B-Y) and (R-Y) color difference signals from the color encoder means, said (B-Y) and (R-Y) color difference signals serving as a modulating wave for the color subcarrier, said quadrature modulation means having a carrier chrominance signal output; a color burst generator means receiving the color subcarrier from the subcarrier generator means, said color burst generator means providing an analog color burst signal; a (B-Y) color difference digital-to-analog converter means receiving the carrier chrominance signal output of the quadrature modulation means and having an output corresponding to the sine component of the carrier chrominance signal output; an (R-Y) color difference digital-to-analog converter means receiving the carrier chrominance signal output of the quadrature modulation means and having an output corresponding to the cosine component of the carrier chrominance signal output; and a luminance and sync digital-to-analog converter means for receiving the luminance signal (Y) from the color encoder means and the horizontal and vertical sync signals from the sync generator so as to generate an analog composite signal (YSYNC); said color burst generator means, said (B-Y) and said (R-Y) color difference digital-to-analog converter means and said luminance and sync digital-to-analog converter means being temporarily disabled upon reception of the disable signal from the sync delay and shading circuit means; said color burst signal, the outputs of the (B-Y) and (R-Y) digital-to-analog converter means, and the composite signal (YSYNC) serving as a composite video signal for the television screen in use.

BRIEF DESCRIPTION OF THE DRAWINGS

Other features and advantages of the present invention will become apparent in the following detailed description of the preferred embodiment with reference to the accompanying drawings, of which:

FIG. 2 is a schematic circuit block diagram of a sync delay and shading circuit of the preferred embodiment.

DETAILED DESCRIPTION OF THE PREFERRED EMBODIMENT

Figure 1:
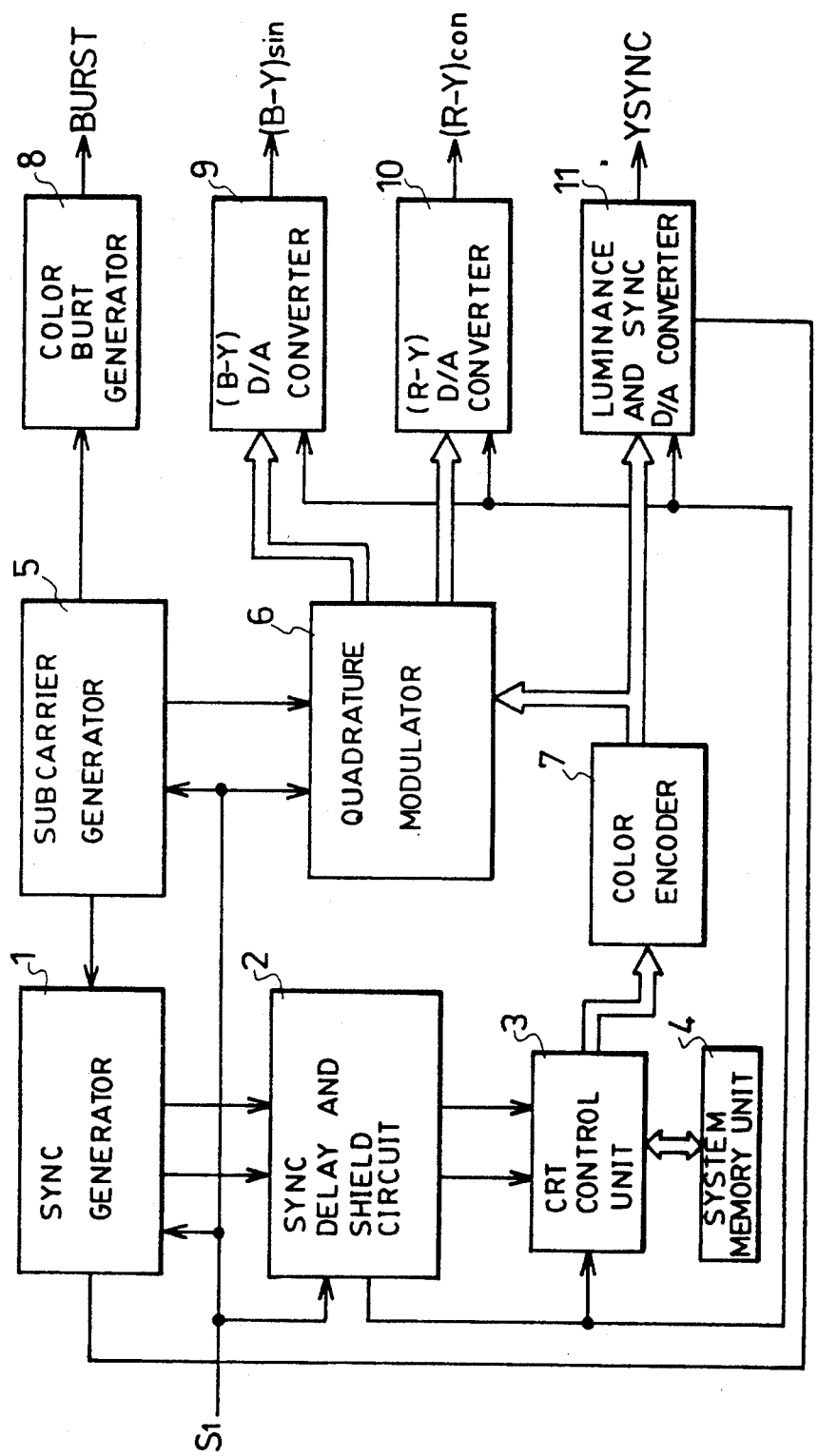
FIG. 1 is a schematic circuit block diagram of the preferred embodiment of an apparatus for showing a digitized NTSC-encoded video signal on an NTSC or PAL color television screen according to the present invention.

Referring to FIG. 1, the preferred embodiment is shown to comprise a sync generator (1), a sync delay and shading circuit (2), a cathode ray tube (CRT) control unit (3), a system memory unit (4), a subcarrier generator (5), a quadrature modulator (6), a color encoder (7), a color burst generator (8), a (B-Y) color difference digital-to-analog (D/A) converter (9), an (R-Y) color difference D/A converter (10) and a luminance and sync D/A converter (11).

The sync generator (1) generates the NTSC or the PAL horizontal and vertical sync signals depending upon the type of color television screen in use, as indicated by the select signal (S1). The sync delay and shading circuit (2) is not in use when an NTSC color television screen is in use. The sync delay and shading circuit (2) provides an appropriate delay to the PAL horizontal and vertical sync signals when a PAL color television screen is in use. The sync delay and shading circuit (2) further provides a disable signal during a 100 line scan period in which no video image is being displayed when the PAL color television screen is in use. The CRT control unit (3) controls the showing of a video image on the color television screen (not shown) and has a pixel color signal output. A digitized NTSC-encoded video signal is stored in the system memory unit (4). The subcarrier generator (5) generates the NTSC or the PAL color subcarrier depending upon the type of color television screen in use. The color encoder (7) generates a luminance signal (Y), a (B-Y) and an (R-Y) color difference signal from the color signal output of the CRT control unit (3). The color subcarrier from the subcarrier generator (5) undergoes quadrature amplitude modulation in the quadrature modulator (6). The (B-Y) and (R-Y) color difference signals serve as the modulating wave for the color subcarrier. The color burst generator (8) receives the color subcarrier from the subcarrier generator (5) and provides an analog color burst signal. The (B-Y) color difference D/A converter (9) has an output corresponding to the sine component of a carrier chrominance signal output of the quadrature modulator (6). The (R-Y) color difference D/A converter (10) has an output corresponding to the cosine component of the carrier chrominance signal output. The luminance and sync D/A converter (11) receives the luminance signal (Y) from the color encoder (7) and the horizontal and vertical sync signals from the sync generator (1) so as to generate an analog composite signal (YSYNC).

The operations of the preferred embodiment when an NTSC color television screen is in use and when a PAL color television screen is in use are as follows:

1. NTSC system

The select signal (S1) is used to indicate that an NTSC color television screen is in use. The sync generator (1) provides the NTSC horizontal and vertical sync signals. The subcarrier generator (5) generates a 3.58 MHz NTSC color subcarrier. The sync delay and shading circuit (2) is disabled at this stage. The horizontal and vertical sync signals are sent directly to the CRT control unit (3) so as to control the access of the digitized NTSC-encoded video signal in the system memory unit (4). The CRT control unit (3) has a pixel color signal output that is received by the color encoder (7). The color encoder (7) generates the luminance signal (Y) and the (B-Y) and (R-Y) color difference signals from the pixel color signal output of the CRT control unit (3). The luminance signal (Y) and the combined sync signals from the sync generator (1) are sent to the luminance and sync D/A converter (11) so as to generate an analog composite signal (YSYNC). The (B-Y) and (R-Y) color difference signals are sent to the quadrature modulator (6) and serve as the modulating waves for the color subcarrier of the subcarrier generator (5) when the latter undergoes a quadrature amplitude modulation process. The sine component of the carrier chrominance signal output of the quadrature modulator (6) is sent to the (B-Y) color difference D/A converter (9), while the cosine component of the carrier chrominance signal output is sent to the (R-Y) color difference D/A converter (10). The color burst generator (8) has an analog output corresponding to the actual phase of the color burst signal (BURST). The color burst signal (BURST) from the color burst generator (8), the sine component of the carrier chrominance signal output [(B-Y)sin] from the (B-Y) D/A converter (9), the cosine component of the carrier chrominance signal output [(R-Y)cos] from the (R-Y) D/A converter (10) and the composite signal (YSYNC) from the luminance and sync D/A converter (11) serve as the composite video signal for the NTSC color television screen.

2. PAL system

When the select signal (S1) is used to indicate that a PAL color television screen is in use, the subcarrier generator (5) generates a 4.43 MHz PAL color subcarrier, while the sync generator (1) provides the PAL horizontal and vertical sync signals. The combined PAL sync signals are sent to the luminance and sync D/A converter (11). However, the PAL horizontal and vertical sync signals are also processed by the sync delay and shading circuit (2) so as to delay or temporarily stop the CRT control unit (3) from accessing the digitized NTSC-encoded video signal in the system memory unit (4).

Referring to FIG. 2, the sync delay and shading circuit (2) comprises a horizontal sync delay circuit (21), a vertical sync delay circuit (22) and a disable signal generator (23).

The horizontal sync delay circuit (21) provides a two-pixel clock delay to the horizontal sync signal (HSYNC), roughly 0.27 microseconds. The horizontal sync delay circuit (21) then sends the delayed horizontal sync signal (D-HSYNC) to the horizontal sync input terminal of the CRT control unit (3). The picture to be shown on the PAL color television screen (not shown) is thus shifted to the right by 0.27 microseconds. The 0.5 microseconds blank in the horizontal direction is of the PAL color television screen.

The vertical sync delay circuit (22) provides a twenty-five horizontal scan line delay to the vertical sync signal (VSYNC). The vertical sync delay circuit (22) then sends the delayed vertical sync signal (D-VSYNC) to the vertical sync input terminal of the CRT control unit (3). The vertical sync frequency is equal to the field frequency. The number of scan lines per field is equal to half of the number of lines per frame. Thus, the first scan line of the NTSC system appears as the twenty-sixth scan line of the PAL system. Two interlaced fields constitute one frame. Thus, one can see fifty blank scan lines on the top portion of the PAL color television screen. Video signal appears on the fifty-first scan line of the television screen. The 100 scan lines in which no video image is being shown are equally distributed on the top and bottom portions of the television screen.

The disable signal generator (23) generates a disable signal to temporarily stop the operation of the CRT control unit (3) during the period of the 100 blank scan lines. The CRT control unit (3) is operated during the remaining 525 scan lines. The disable signal is also sent to the (B-Y), (R-Y) and luminance and sync D/A converters (9, 10, 11). A shaded region corresponding to 50 scan lines can be seen on the top and bottom portions of the PAL color television screen. This prevents the occurrence of distorted images and can thus provide a better viewing effect. The outputs of the four D/A converters (8, 9, 10, 11) serve as the composite video signal for the PAL color television screen.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An apparatus for showing a digitized NTSC-encoded video signal on an NTSC or PAL color television screen, comprising:

a system memory unit for storing a digitized NTSC-encoded video signal therein;

a sync generator means for generating an NTSC horizontal sync signal and an NTSC vertical sync signal when an NTSC color television screen is in use, and for generating a PAL horizontal sync signal and a PAL vertical sync signal when a PAL color television screen is in use;

a sync delay and shading circuit means for providing an appropriate delay to said PAL horizontal and vertical sync signals, said sync delay and shading circuit means being disabled when an NTSC color television screen is in use, said sync delay and shading circuit means providing a disable signal during a 100 line scan period in which no video image is being displayed when a PAL color television is in use;

a cathode ray tube control unit receiving said NTSC horizontal and vertical sync signals when an NTSC color television screen is in use, said cathode ray tube control unit receiving the delayed said PAL horizontal and vertical sync signals when a PAL color television screen is in use, said horizontal and vertical sync signals controlling said cathode ray tube control unit to access said digitized NTSC-encoded video image in said system memory unit, said cathode ray tube control unit having a pixel color signal output and being temporarily disabled upon reception of said disable signal from said sync delay and shading circuit means;

a subcarrier generator means for generating an NTSC color subcarrier when an NTSC color television screen is in use and for generating a PAL color subcarrier when a PAL color television screen is in use;

a color encoder means to generate a luminance signal (Y), a (B-Y) color difference signal and an (R-Y) color difference signal from said pixel color signal output of said cathode ray tube control unit;

a quadrature modulation means receiving said color subcarrier from said subcarrier generator means and said (B-Y) and (R-Y) color difference signals from said color encoder means, said (B-Y) and (R-Y) color difference signals serving as a modulating wave for said color subcarrier, said quadrature modulation means having a carrier chrominance signal output;

a color burst generator means receiving said color subcarrier from said subcarrier generator means, said color burst generator means providing an analog color burst signal;

a (B-Y) color difference digital-to-analog converter means receiving said carrier chrominance signal output of said quadrature modulation means and having an output corresponding to the sine component of said carrier chrominance signal output;

an (R-Y) color difference digital-to-analog converter means receiving said carrier chrominance signal output of said quadrature modulation means and having an output corresponding to the cosine component of said carrier chrominance signal output; and a luminance and sync digital-to-analog converter means for receiving said luminance signal (Y) from said color encoder means and said horizontal and vertical sync signals from said sync generator so as to generate an analog composite signal (YSYNC);

said color burst generator means, said (B-Y) and said (R-Y) color difference digital-to-analog converter means and said luminance and sync digital-to-analog converter means being temporarily disabled upon reception of said disable signal from said sync delay and shading circuit means;

said color burst signal, the outputs of said (B-Y) and said (R-Y) digital-to-analog converter means, and said composite signal (YSYNC) serving as a composite video signal for the television screen in use.

* * * * *